Mar. 20, 1923.
C. LEMERY
1,449,120
TRANSMISSION BAND ADJUSTING MEANS
Filed Feb. 1, 1921    2 sheets-sheet 2
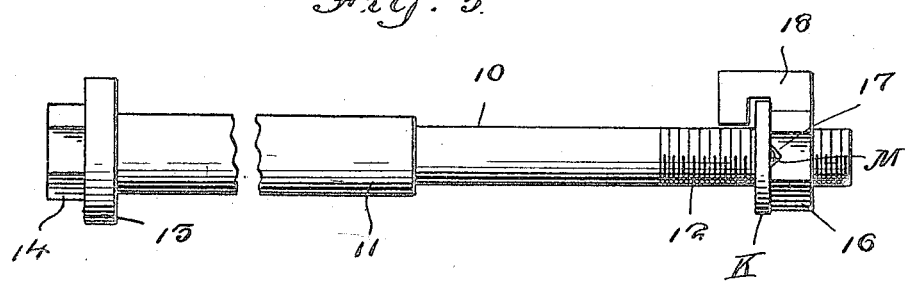
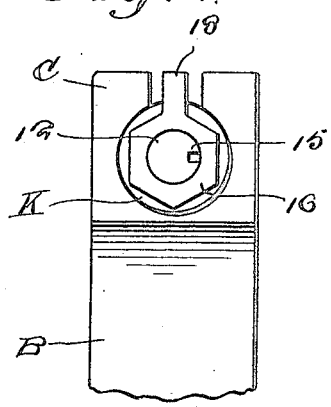 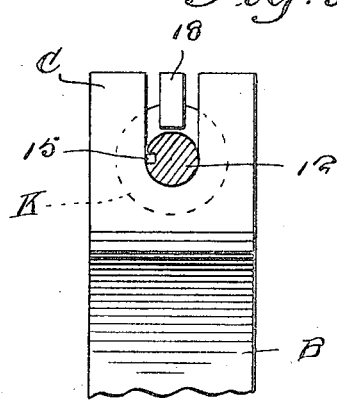
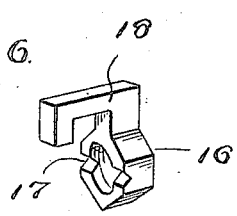 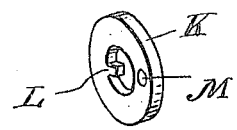
Inventor
Charles Lemery
By A. A. Gourick
Attorney Patented Mar. 20, 1923.

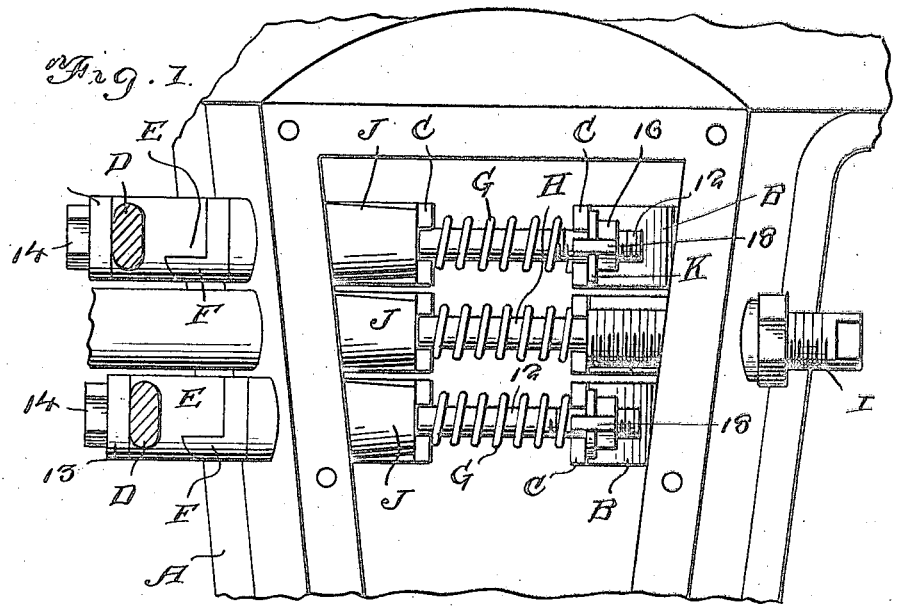

1,449,120

UNITED STATES PATENT OFFICE.

CHARLES LEMERY, OF SACRAMENTO, CALIFORNIA.

TRANSMISSION-BAND-ADJUSTING MEANS.

Application filed February 1, 1921. Serial No. 441,589.

*To all whom it may concern:*

Be it known that I, CHARLES LEMERY, a citizen of the United States, residing at Sacramento, in the county of Sacramento and State of California, have invented new and useful Improvements in Transmission-Band-Adjusting Means, of which the following is a specification.

This invention relates to the transmission of automobiles, particularly to transmissions of the planetary type and has for its object the provision in the transmission of a Ford automobile of a novel operative connection between the pedals and the contractile bands encircling the transmission drums whereby the brake and reverse bands may be adjusted from the outside of the casing without any necessity for removing the cover door as is necessary in the ordinary construction.

An important object is the provision of a connection of this character which is designed to replace the ordinary operating rod which connects the pedal with the associated band, the difference in other respects not necessitating any changes or alterations in the transmission.

An additional object is the provision of a device of this character which will be very simple and inexpensive in construction, easy to install, highly efficient in use, durable in service, and a general improvement in the art.

With the above and other objects and advantages in view, the invention consists in the details of construction to be hereinafter more fully described and claimed and illustrated in the accompanying drawings in which Figure 1 is a plan view of a portion of the transmission of a Ford automobile, showing my invention applied, Figure 2 is a cross sectional view, Figure 3 is an enlarged side elevation of the bolt, Figure 4 is an elevation of the gear at one end of a band and showing an end view of the bolt and nut, Figure 5 is a cross sectional view on the line 5—5 of Figure 2, Figure 6 is a perspective view of the nut, and Figure 7 is a perspective view of the washer.

Referring more particularly to the drawings, the letter A designates the transmission cover of a Ford automobile which forms the top closure for a transmission which includes a plurality of drums, not shown, encircled by contractile friction bands B carrying forked ears C at their ends. There are three drums and three bands whereby to effect the braking action, the reverse, and the low speed, as is well known in the art. The construction and arrangement is such that either band may be contracted to effect the desired grip upon the associated drum by pressure upon the pedal D having a cam portion E co-operating with a stationary cam portion F carried by the cover A so as to effect longitudinal movement of a rod which passes through the forked ears of the band and which carries an adjusting nut which is provided for the purpose of regulating the distance between the ears, as is well known. A coil spring G encircles the rod and abuts against the ears for normally holding the bands expanded. In the ordinary construction the rod H which operates the low speed band has associated therewith an adjusting screw I which extends through the right side of the cover A. It is the brake and reverse drums which carry adjusting nuts, as above described. In this ordinary construction the low speed band is adjusted from the outside of the transmission cover while in order to adjust the brake and reverse bands it is necessary to remove the small door provided in the top of the cover for this purpose. After removing the door it is a troublesome matter to insert a wrench and turn up the adjusting nuts as the space is very limited and as there is always danger of dropping a tool into the transmission.

It is with the above defects in mind that I have designed the present invention which provides means for adjusting the reverse and brake drums from the outside of the cover. In effecting this purpose it is necessary to disassociate the brake and reverse pedals from the operating rods to which they are ordinarily rigidly secured. These operating rods are then discarded. I replace each of these operating rods with an elongated bolt 10 which passes through the hub of the operating pedal and upon which the pedal is rotatable. The portion of the bolt which is disposed through the bearing member J in the cover is relatively large, as shown at 11, while the end within the cover is reduced and threaded, as shown at 12. The outer end portion of the bolt is formed with a bearing flange which bears against the pedal hub and the extreme end is formed angular, as shown at 14, for engagement by a wrench. The reduced end 12 is formed with a longitudinal key-way 15 in exactly the same manner as the ordinary operating rod. This reduced portion of the rod extends through the forked ears and through the coil spring G. Disposed upon the reduced end of the bolt is the usual washer K having an inwardly extending tit L engaged within the key-way 15. The outer face of this washer is provided with the usual stamped-out projection M.

Instead of using the ordinary adjusting nut I provide a specially constructed nut shown in detail in Figure 6 and this nut comprises a body 16 formed in its face toward the washer with notches 17 co-operating with the projection M. Formed upon the body 16 is an extension 18 which is disposed within the fork of the adjacent ear C and this extension is of hook-shape to engage over the washer K.

When the bolt 10 is inserted and the washer and nut applied thereto, as shown in the drawings, it will be apparent that when it is desired to tighten either the brake or the reverse bands it is merely necessary that the operator engage a wrench upon the bolt head 14 and turn it whereupon the ears C will be drawn together. Owing to the fact that the extension 18 of the nut engages within the fork of the adjacent ear it will be apparent that the nut will be held stationary so that it cannot rotate with the bolt.

From the foregoing description and a study of the drawings it will be apparent that I have thus provided an extremely simple device by means of which the brake and reverse bands of a Ford automobile transmission may be quickly and easily adjusted from the outside of the transmission cover, the device being of material advantageousness in simplifying the operation and rendering it less troublesome in every way.

While I have shown and described the preferred embodiment of my invention, it is of course to be understood that I reserve the right to make such change in the form, construction, and arrangement of parts as will not depart from the spirit of the invention or the scope of the subjoined claims.

Having thus described my invention, I claim:

1. In a motor vehicle transmission including a plurality of drums mounted within a casing, bands encircling the drums and formed with forks, and pedals provided with cam means for effecting movement thereof laterally with respect to the casing when the pedals are rocked; a rod slidably mounted through one side of the casing and serving as a pivot for one of the pedals, said rod being disposed within the forks of said ears, and an adjustable connection between the rod and one of the ears, said connection comprising a nut adjustable upon the rod and held immovable with respect to the adjacent ear, and a washer keyed upon the bolt and having a ratchet engagement with the nut.

2. In a motor vehicle transmission including a plurality of drums mounted within a casing, bands encircling the drums and formed with forks, and pedals provided with cam means for effecting movement thereof laterally with respect to the casing when the pedals are rocked; a rod slidably mounted through one side of the casing and serving as a pivot for one of the pedals, said rod being disposed within the forks of said ears, and an adjustable connection between the rod and one of the ears, comprising a nut threaded upon the rod and formed with an extension engaged within the fork of the adjacent ear.

3. In a motor vehicle transmission including a plurality of drums mounted within a casing, bands encircling the drums and formed with forks, and pedals provided with cam means for effecting movement thereof laterally with respect to the casing when the pedals are rocked; an operative connection between a pedal and a band comprising a bolt passing through the hub of the pedal, through one side of the casing and through the forks of the ears, a nut threaded upon the bolt and having its side toward the adjacent ear formed with notches, a washer keyed upon the bolt between the nut and the adjacent ear and having a tooth engageable within either of said notches.

4. In a motor vehicle transmission including a plurality of drums mounted within a casing, bands encircling the drums and formed with forks, and pedals provided with cam means for effecting movement thereof laterally with respect to the casing when the pedals are rocked; an operative connection between a pedal and a band comprising a bolt passing through the hub of the pedal, through one side of the casing and through the forks of the ears, a nut threaded upon the bolt and having its side toward the adjacent ear formed with notches, a washer keyed upon the bolt between the nut and adjacent ear and having a tooth engageable within either of said notches, and a hook shaped extension on the nut passing through the fork in the adjacent ear and overhanging the washer.

5. The combination with a casing, a pedal supported by said casing and a part located in said casing and moved by said pedal, of a bolt having a head bearing against said pedal, oppositely disposed faces in said part, a nut threaded on said bolt bearing against said part and a key portion on said nut embraced by said faces.

In testimony whereof I hereto affix my signature.

CHARLES LEMERY.